Figure 1:
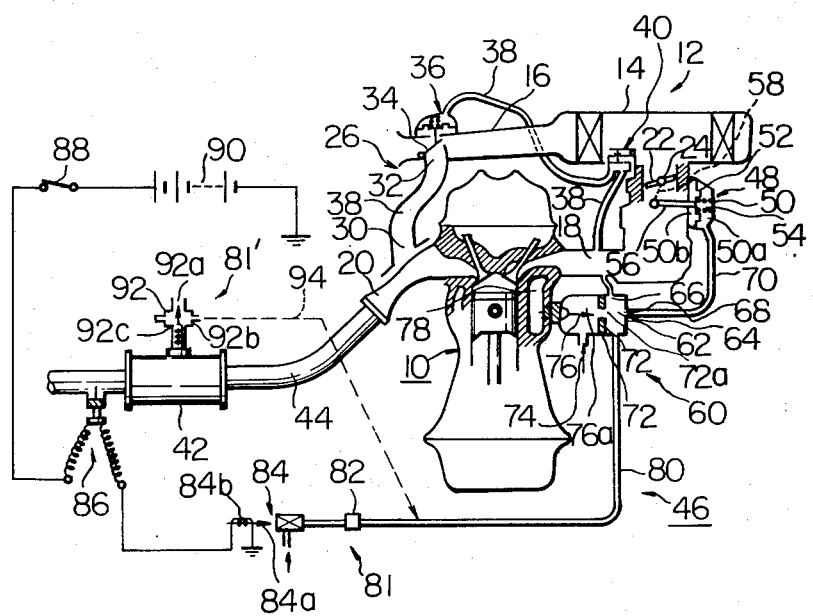

United States Patent [19]
Masaki

[11] 3,807,172
[45] Apr. 30, 1974

[54] METHOD AND APPARATUS FOR REDUCING TOXIC COMPOUNDS IN EXHAUST GASES FROM INTERNAL COMBUSTION ENGINE

[75] Inventor: Kenji Masaki, Yokohama, Japan

[73] Assignee: Nissan Motors Company, Limited, Yokohama City, Japan

[22] Filed: Aug. 15, 1972

[21] Appl. No.: 280,754

[30] Foreign Application Priority Data
Dec. 28, 1971 Japan.............................. 46-472270

[52] U.S. Cl.................. 60/284, 60/285, 123/119 F
[51] Int. Cl............................................. F02b 75/10
[58] Field of Search............ 60/284, 285; 123/119 F

[56] References Cited
UNITED STATES PATENTS
| | | | |
|---|---|---|---|
| 3,172,251 | 3/1965 | Johnson | 60/285 |
| 3,680,318 | 8/1972 | Nakajima | 60/290 |
| 3,706,444 | 12/1972 | Masaki | 123/119 F |

Primary Examiner—Douglas Hart

[57] ABSTRACT

A method and apparatus for reducing noxious and harmful compounds contained in exhaust emitted from a gasoline powered internal combustion engine. The method comprising the steps of detecting the temperature of an exhaust gas treating device provided in the engine or the temperature of the exhaust gases passing through the exhaust gas treating device, and controlling the air-fuel ratio of an air-fuel mixture to be supplied to the engine in accordance with the variations in the temperature of the exhaust gas treating device or the temperature of the exhaust gases therein so as to maintain the exhaust gas treating device at its optimum performance efficiency. In one preferred embodiment, the apparatus is arranged to utilize a choke valve disposed in a carburetor of the engine for controlling the air-fuel ratio of the air-fuel mixture to be supplied to the engine in accordance with the variations in the temperature of the exhaust gas treating device or the temperature of the exhaust gases therein. In another preferred embodiment, the appratus is arranged to utilize a power valve assembly provided in the carburetor of the engine for controlling the air-fuel ratio of the air-fuel mixture to be supplied to the engine in dependence on the variations in the temperature of the exhaust gas treating device or the temperature of the exhaust gases therein.

1 Claim, 2 Drawing Figures

METHOD AND APPARATUS FOR REDUCING TOXIC COMPOUNDS IN EXHAUST GASES FROM INTERNAL COMBUSTION ENGINE

This invention relates in general to gasoline powered internal combustion engines for motor vehicles and, more particularly, to a method and apparatus for reducing noxious and harmful compounds such as hydrocarbons and carbon monoxides contained in exhaust gases emitted from the gasoline powered internal combustion engines.

Various attempts have heretofore been made for the purpose of reducing the concentrations of unburned or partially burned hydrocarbons and carbon monoxides contained in exhaust gases emitted from a gasoline powered internal combustion engine. One useful means to achieve this purpose is to have the gasoline powered internal combustion engine equipped with a thermal reactor by which the exhaust gases are re-combusted and converted into harmless gases. It is, in this instance, known that, when the exhaust gases entering the thermal reactor contain the carbon monoxides in a considerable concentration, the re-combustion efficiency is increased to effect satisfactory combustion of the unburned hydrocarbons, whereas, when the exhaust gases contain a small amounts of carbon monoxides, less re-combustion efficiency is caused and, therefore, the carbon monoxides per se and hydrocarbons remain still unburned in considerable concentrations even after the exhaust gases have been treated in the thermal reactor. Thus, the re-combustion efficiency of the thermal reactor will depend on a variation in the concentrations of the unburned carbon monoxides in the exhaust gases introduced into the thermal reactor.

Another important expedient is to employ a catalytic converter by which the unburned compounds in the exhaust gases are oxidized by the catalytic reaction of a catalizer bed mounted therein. The catalytic converter becomes effective to cause catalyst substance of the hydrocarbons and carbon monoxides contained in the exhaust gases after the catalyzer bed has reached its operating temperature and, when the exhaust gases entering the catalytic converter contain a large amount of hydrocarbons, the catalyst substance will be brought to an excessively elevated temperature relatively rapidly so that the catalyst substance will be destroyed.

It is well known that the quantity of unburned hydrocarbons and carbon monoxides contained in the exhaust gases will vary in accordance with the air-fuel ratio of an air-fuel mixture to be supplied to the combustion chamber of the engine because the combustion efficiency of the air-fuel mixture will depend on the air-fuel mixture thereof. It is thus desired that the air-fuel ratio of the air-fuel mixture to be delivered to the engine be varied to control the combustion efficiency of the air-fuel mixture supplied to the engine for thereby varying the quantities of the unburned hydrocarbons and carbon monoxides in the exhaust gases emitted therefrom to values appropriate for causing the thermal reactor and the catalytic converter to operate as an exhaust gas treating device at a maximum performance efficiency.

It is, therefore, an important object of the present invention to provide a method and apparatus for minimizing the concentration of the noxious and harmful compounds contained in exhaust gases emitted from a gasoline powered internal combustion engine in a simplified manner.

It is another object of the present invention to provide a method and apparatus for reducing the concentration of the noxious and harmful compounds in the exhaust gases from the gasoline powered internal combustion engine by advantageously combining the gasoline powered internal combustion engine with an exhaust gas treating device.

It is a further object of the present invention to provide a method and apparatus which are adapted to control the air-fuel ratio to be supplied to the gasoline powered internal combustion engine associated with the exhaust gas treating device for varying the quantity of unburned hydrocarbons and carbon monoxides in the exhaust gases to be admitted to the exhaust gas treating device so as to cause the exhaust gas treating device to operate at an optimum performance efficiency.

It is a still further object of the present invention to provide a method and apparatus which are adapted to control the air-fuel mixture to be supplied to the gasoline powered internal combustion engine in dependence on the variations in the temperature of the exhaust gas treating device associated with the gasoline powered internal combustion or the temperature of the exhaust gases in the exhaust gas treating device whereby the quantity of unburned hydrocarbons and carbon monoxides in the exhaust gases can be varied to maintain the exhaust gas treating device at its maximum performance efficiency during the operation thereof for thereby satisfactorily eliminating the concentrations of the toxic compounds in the exhaust gases to be emitted to the atmosphere.

It is a still further object of the present invention to provide a method and apparatus for reducing the concentration of the toxic compounds in the exhaust gases from the gasoline powered internal combustion engine in a manner which is readily operable with a low cost and in a simple construction.

In general, these and other objects of the present invention can be achieved by a method and apparatus for reducing noxious and harmful compounds contained in exhaust gases emitted from a gasoline powered internal combustion engine. The method comprises the steps of detecting the temperature of an exhaust gas treating device or the temperature of the exhaust gases therein and controlling the air-fuel ratio of an air-fuel mixture to be supplied to the gasoline powered internal combustion engine so as to maintain the exhaust gas treating device at its optimum performance efficiency. In one preferred embodiment, the apparatus comprises a choke actuating device adapted for opening and closing the choke valve mounted in a carburetor of the gasoline powered internal combustion engine for thereby varying the amount of suction air to be mixed with fuel to provide an air-fuel mixture of proper air-fuel ratio, which choke actuating device is operated by an intake manifold vacuum delivered from an intake manifold of the engine, a vacuum level control device provided between the intake manifold and the choke actuating device and having a vacuum level control chamber leading to the choke actuating device, and an atmospheric pressure supply control means associated with he vacuum level control device for varying the level of the intake manifold vacuum to be delivered to the choke actuating device in dependence on the variations in the temperature of the exhaust gas treating device or the temperature of the exhaust gases therein. The choke actuating device is arranged to close the choke valve when the intake manifold vacuum delivered thereto is at level and to open the choke valve when the level of the intake manifold vacuum admitted is at high level. The atmospheric pressure supply control means may include an atmospheric pressure supply conduit having one end communicating with the vacuum level control chamber of the vacuum level control device and the other end communicating with the ambient atmosphere for admitting atmospheric air therethrough to the vacuum level control chamber thereby to decrease the level of the intake manifold vacuum therein, a flow restricting means provided in the atmospheric pressure supply conduit, a solenoid control valve provided at the end of the atmospheric pressure supply conduit for opening and closing the end of the atmospheric pressure supply conduit for thereby selectively admitting the atmospheric pressure to the vacuum level control chamber, and a temperature responsive switch electrically connected to the solenoid control valve. The temperature responsive switch is adapted to energize the solenoid control valve for opening the end of the atmospheric pressure supply conduit when the temperature of the exhaust gas treating device is operating at a relatively low level and to de-energize the solenoid control valve for closing the end of the atmospheric pressure supply conduit when the temperature of the exhaust gas treating device exceeds a certain given level. In another preferred embodiment, the apparatus is associated with a power valve assembly provided in a carburetor of the engine. The apparatus includes a first auxiliary air supply conduit having one end communicating with a vacuum chamber of the power valve assembly and the other end connected to a main conduit vented to the ambient atmosphere, a second auxiliary air supply conduit having one end communicating with a slow-running port provided in the carburetor through a slow-running air bleed and the other end connected to the main air supply conduit, a solenoid control valve disposed in a position to control communications between the first conduit and the main conduits and the second conduit and the main conduits, and a temperature responsive switch electrically connected to the solenoid control valve for controlling the same in dependence on the variations in the temperature of an exhaust gas treating device. The solenoid control valve is arranged to establish communication between the first conduit and the main conduit when energized while interrupting communication between the second and main conduits and to establish communication between the second and main conduits while interrupting communication between the first and main conduits when de-energized. The temperature responsive switch is adapted to energize the solenoid control valve when the temperature of the exhaust gas treating device is at low level and to de-energize the solenoid control valve when the temperature of the exhaust gas treating device exceeds a predetermined level. With this arrangement, if a exhaust gas treating device is operating at a relatively low level, then the temperature responsive switch is closed to energize the solenoid control valve so that the first atmospheric pressure supply conduit is caused to communicate with the main atmospheric pressure supply conduit thereby admitting the atmospheric pressure to the vacuum chamber of the power valve assembly. In this condition, the power valve assembly is operated to permit additional fuel to pass into a main mixture circuit for thereby providing an enriched air-fuel mixture, which is supplied through the carburetor induction passage into the engine. Consequently, the exhaust gases emitted from the engine contain large quantity of unburned compounds which promote the oxidizing reaction of the exhaust gas treating device resulting in the increase in the temperature of the exhaust treating device. If, however, the exhaust gas treating device reaches an excessively high temperature, then the temperature responsive switch is opened to de-energize the solenoid control valve so that the second atmospheric pressure conduit is caused to communicate with the main conduit while the communication between the first atmospheric pressure supply conduit and the main atmospheric pressure conduit is interrupted. In this instance, additional air is admitted through the second atmospheric conduit into the slow-running air bleed, from which the additional air is drawn into the carburetor induction passage through the slow-running port. At the same time, since the atmospheric pressure is prevented from being admitted to the vacuum chamber of the power valve assembly and, therefore, the power valve assembly is caused to prevent additional fuel from being admitted to the main mixture circuit. Thus, the air-fuel mixture to be delivered to the engine is leaned and, accordingly, the temperature of the exhaust gas treating device is decreased to a certain level.

Figure 2:
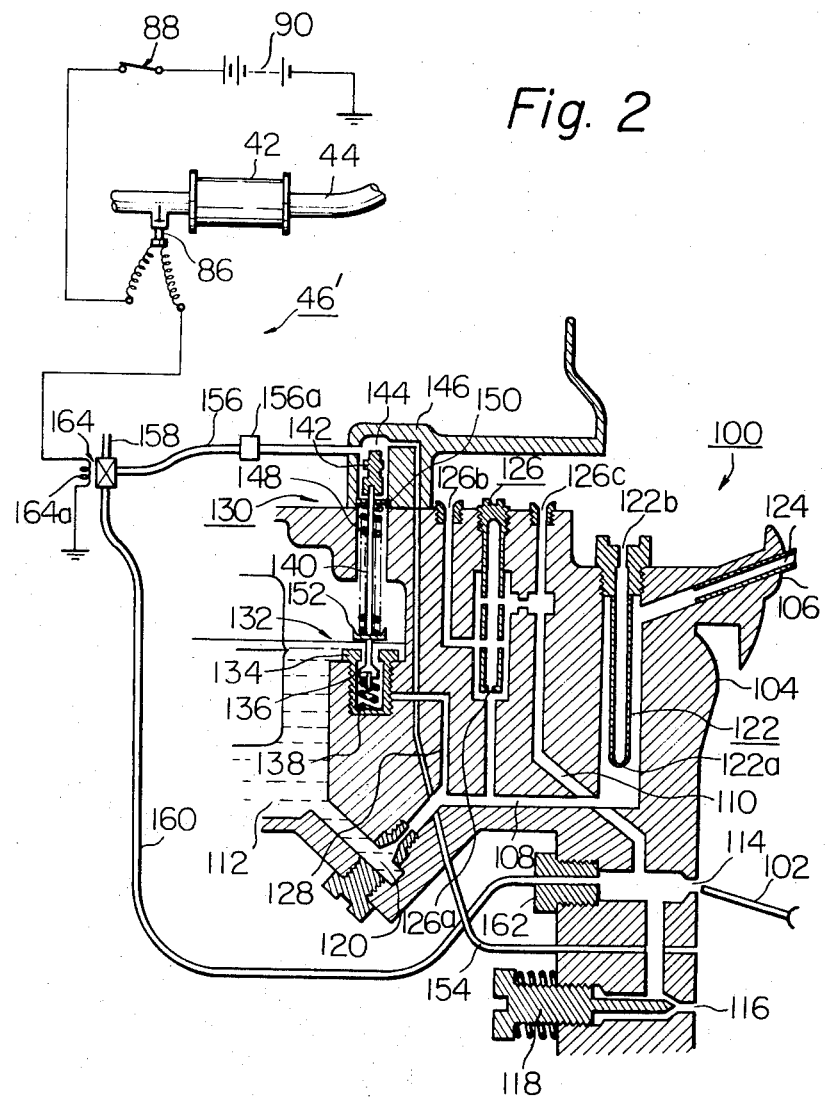

These and other features and advantages of the method and apparatus according to the present invention will become more apparent from the following description when taken in conjunction with the accompanying drawings in which corresponding parts and elements are designated by like reference numerals throughout the figures and in which:

FIG. 1 is a schematic view of a preferred example of an apparatus for reducing toxic compounds in the exhaust gases from a gasoline powered internal combustion engine for carrying out the method according to the present invention; and FIG. 2 is a schematic view of another preferred example of the apparatus for carrying out the method according to the present invention.

Referring now to FIG. 1, there is schematically shown a preferred example of the apparatus for carrying out the method according to the present invention, the apparatus being shown as incorporated in a conventional gasoline powered internal combustion engine. The gasoline powered internal combustion engine, which is generally designated by the reference numeral 10, has, as customary, a carburetor 12 leading from an air cleaner 14 having an air duct 16, an intake manifold 18 leading from the air cleaner 14, and an exhaust manifold 20. As shown, the carburetor 12 is usually provided with a choke valve 22 which is fixedly mounted on a rotatable shaft 24 and which is controlled to vary the amounts of air to be mixed with fuel to produce an air-fuel mixture in a manner as will be described hereinafter in detail. The gasoline powered internal combustion engine 10 is shown as provided with a faster warm-up mechanism adated for effecting faster warm-up of the engine during starting and warm-up operations of the engine. The faster warm-up mechanism, designatd at 26, includes a heated air supply pipe 28 having a heated air inlet 30 mounted adjacent the outer surface of the exhaust manifold 20 and a heated air outlet 32 communicating with the air duct 16 leading to the air cleaner 14. A valve member 34 is operatively disposed in the air duct 16 for opening and closing the outlet 32 of the heated air supply pipe 28. This valve member 34 is actuated by a diaphragm assembly 36 in response to an intake manifold vacuum delivered through a conduit 38 leading to the intake manifold 18 of the engine 10. The level of the intake manifold vacuum to be admitted to the diaphragm assembly 36 is modulated by a temperature responsive control means 40, which is interposed in the conduit 38. This temperature responsive control means functions to increase the level of the intake manifold vacuum to be supplied to the diaphragm assembly 36 when the temperature of the air prevailing in the air cleaner 14 is below a predetermined level so that the diaphragm assembly 36 actuates the valve member 34 to open the heated air outlet 32 of the heated air supply pipe 28 thereby to admit the heated air therethrough to the air duct 16 whereby the air to be supplied to the engine is warmed up to effect satisfactory starting of the engine.

In accordance with an important feature of the present invention, the air-fuel ratio of the air-fuel mixture to be supplied to the engine is controlled in dependence on the variations in the temperature of an exhaust gas treating device which is incorporated in the gasoline powered internal combustion engine 10 or the temperature of the exhaust gases in the exhaust gas treating device thereby to vary the quantities of the unburned hydrocarbons and carbon monoxides in the exhaust gases so as to cause the exhaust gas treating device to operate at its maximum performance efficiency. The exhaust gas treating device, indicated at 42, is disposed in an exhaust pipe 44 connected to the exhaust manifold 20 of the engine 10 and functions to eliminate the concentrations of the noxious and harmful compounds in the exhaust gases before the exhaust gases are expelled to the atmosphere. The exhaust gas treating device 42 may comprise a thermal reactor or a catalytic converter of known construction.

In the illustrated embodiment of FIG. 1, the air-fuel ratio of the air-fuel mixture to be supplied to the engine is controlled by the use of the choke valve 22 which has previously described hereinabove. The apparatus to achieve this end, which is denoted at 46, includes a choke actuating device 48. The choke actuating device 48 may be of any suitable construction and, in the illustrated embodiment, comprises a diaphragm housing 50 having a vacuum chamber 50a and an atmospheric chamber 50b, a flexible diaphragm 52 disposed in the diaphragm housing 50 and dividing the same into the vacuum chamber 50a and the atmospheric chamber 50b, a compression spring 54 disposed in the vacuum chamber 50a for biasing the diaphragm 52 in a direction to close the choke valve 22, and a plunger 56 fixedly connected to the flexible diaphragm 52 at its one end and connected to an actuating lever 58 at its other end, the actuating lever 58 being mounted on the rotatable shaft 24 for opening the closing the choke valve 22. The choke actuating device 48 is controlled by an intake manifold vacuum delivered from the intake manifold 18 of the engine 10, the level of the intake manifold vacuum being controlled by a thermostatically controlled vacuum level control device 60.

The thermostatically controlled vacuum level control device 60 is shown to include a housing 62 having formed therein a vacuum level control chamber 64. The vacuum level control chamber 64 has an inlet 66 communicating with the intake manifold 18 and an outlet 68 communicating through a conduit 70 with the vacuum chamber 50a of the choke actuating device 48. A partition wall means 72 is disposed in the housing 62 for defining the vacuum level control chamber 64. This wall means 72 has a control aperture 72a which communicates with the vacuum level control chamber 64. The housing also has an air vent 74 vented to the atmosphere for admitting the atmospheric pressure through the control aperture 72a of the partition wall means 72 to the vacuum level control chamber 64 for thereby decreasing the level of the intake manifold vacuum to be delivered to the conduit 70 leading to the choke actuating device 48. The thermostatically controlled vacuum level 60 control device also includes a thermostatic valve means 76 which is mounted in a water jacket 78 formed in the body of the engine 10 to be responsive to the temperature of the engine cooling liquid contained in the water jacket 78. This thermostatic valve means 76 has an end portion 76a facing the control aperture 72a for controlling the effective cross sectional area thereof in dependence on the variations in the temperature of the engine cooling liquid.

With this arrangement, when the cooling liquid contained in the water jacket 78 is at low level during starting of the engine, the thermostatic valve means 76 assumes the position shown in FIG. 1 so that the end portion 76a fully opens the control aperture 72a. In this condition, the vacuum level control chamber 64 communicates with the air vent 74 so that the atmospheric pressure is admitted into the vacuum level control chamber 64. Thus, the level of the intake manifold vacuum is decreased. This decreased intake manifold vacuum is transmitted through the outlet 68 into the conduit 70, through which the intake manifold vacuum is admitted into the vacuum chamber 50a of the choke actuating device 48. Since, in this condition, the level of the intake manifold vacuum is low and accordingly the diaphragm 52 is moved leftwardly, as viewed in FIG. 1, by the action of the compression spring 54 thereby moving the plunger 56 in the same direction to cause the actuating lever 58 to close the choke valve 22. Under this circumstance, the amount of air to be mixed with fuel is small to provide an enriched air-fuel mixture to effect satisfactory starting of the engine.

When, however, the engine cooling liquid is warmed up to a certain elevated temperature during crushing, the thermostatic valve means 76 is caused to extend rightwardly of the drawing to decrease the degree of communication between the vacuum level control chamber 64 and the air vent 74. Consequently, the level of the intake manifold vacuum to be delivered to the vacuum chamber 50a of the choke actuating device 48 is increased. This increased intake manifold vacuum acts on the diaphragm 52 and, therefore, the diaphragm 52 is moved rightwardly of the drawing against the force of the compression spring 54 thereby moving the plunger 56 in the same direction to cause the actuating lever 58 to open the choke valve 22. In this condition, the air is passed through the choke valve 22 in large quantity so that a lean air-fuel mixture is provided. It will thus be notd that the choke valve 22 is fully opened when the engine temperature reaches the predetermined value, that is, where the engine is completely warmed-up.

As already described hereinabove, it is an essential feature of the present invention that the air-fuel ratio of the air-fuel mixture to be supplied to the engine is controlled in dependence on the variations in the temperature of the exhaust gas treating device or the temperature of the exhaust gas in the exhaust gas treating device so as to promote oxidizing reaction of the exhaust gas treating device. The apparatus 46 further includes an atmospheric pressure supply conduit 80 having one end communicating with the vacuum level control chamber 64 and the other end vented to the atmosphere, and an atmospheric pressure supply control means 81 provided at the end of the conduit 80.

In one preferred embodiment, the atmospheric pressure supply control means 81 includes a flow restricting means 82 which limits the amount of atmospheric air passing therethrough. It should be appreciated that the effective sectional area of the flow restricting means 82 is so determined as to maintain the intake manifold vacuum at a value to provide a suitable opening condition of the choke valve 22. As shown, the control means 81 also includes a solenoid control valve 84 having a movable core or plunger 84a which opens and closes the atmospheric pressure supply conduit 80 for selectively admitting the atmospheric pressure to the vacuum level control chamber 64 and a solenoid coil 84b associated with the plunger 84a. This solenoid coil 84 may be of any known suitable construction and, therefore, the detail description of the construction will be herein omitted for the sake of simplicity of description. The solenoid coil 84b of the solenoid control valve 84 is electrically connected through a temperature responsive switch 86 and an ignition switch 88 to a d.c. voltage source 90. The temperature responsive switch 86 may be of any suitable construction insofar as it functions to energize the solenoid coil 84b of the solenoid control valve 84 for thereby opening the conduit 80 when the temperature of the exhaust gases is at relatively low level and to de-energize the solenoid coil 84b for closing the conduit 80 when the temperature of the exhaust gases reaches an excessively high level. It should be understood that the temperature responsive switch 86 is shown in FIG. 1 as mounted in the exhaust pipe 44 downstream of the exhaust gas treating device but the temperature responsive switch 86 may be directly mounted on the housing of the exhaust gas treating device 42 to respond to the temperature thereof.

Before entering into detail discussion of the operation of the apparatus 46, let it be assumed that the gasoline powered internal combustion engine 10 is completely warmed up and, accordingly, the control aperture 72a formed in the partition wall means 72 is fully closed by the end of the thermostatic valve means 76 whereby the intake manifold vacuum admitted to the choke actuating device 48 is maintained at a relatively high level thereby moving the diaphragm 52 and accordingly the plunger 56 in a direction to fully open the choke valve 22. If, in this condition, the performance efficiency, that is, the oxidizing reaction of the exhaust gas treating device 42 becomes less due to the lean air-fuel mixture to be admitted to the engine 10, then the temperature of the exhaust gases in the exhaust pipe 44 downstream of the exhaust gas treating device 42 is caused to rapidly decrease. Under this circumstance, the temperature responsive switch 86 is closed to energize the solenoid 84b of the solenoid control valve 84 so that the plunger 84a is retracted to cause the end of the atmospheric pressure supply conduit 80 to open to the atmosphere. Consequently, the atmospheric pressure is admitted through the conduit 80 to the vacuum level control chamber 64 thereby decreasing the level of the intake manifold vacuum therein. This decreased intake manifold vacuum is delivered through the conduit 70 to the vacuum chamber 50a of the choke actuating device 48 with a result that the diaphragm 52 and accordingly the plunger 56 are moved leftwardly by the action of the compression spring 54, as viewed in FIG. 1, to rotate the actuating lever 58 clockwise for thereby closing the choke valve 22. Thus, the air-fuel mixture to be supplied to the engine is enriched and, therefore the quantities of the unburned compounds in the engine exhaust gases are increased so that the oxidizing reaction of the exhaust gas treating device 42 is facilitated for thereby satisfactorily reducing the noxious and harmful compounds in the engine exhaust gases before the engine exhaust gases are expelled to the atmosphere.

If, however, the temperature of the exhaust gases or the temperature of the exhaust gas treating device reach an excessively high level because of increased performance efficiency of the exhaust gas treating device 42, then the temperature responsive switch 86 is opened thereby de-energizing the solenoid coil 84b of the solenoid control valve 84. In this instance, the plunger 84a is protruded to close the end of the atmospheric pressure supply conduit 80 so that no atmospheric pressure is admited to the vacuum level control chamber 64 of the vacuum level control device 60. Thus, the intake manifold vacuum in the vacuum level control chamber 64 is maintained at a high level. This intake manifold vacuum is delivered through the conduit 80 to the vacuum chamber 50a of the choke actuating device 48 and acts on the diaphragm 52 thereby moving the diaphragm 52 rightwardly of the drawing against the force of the compression spring 54. This causes the plunger 56 to rotate the actuating lever 58 counterclockwise thereby opening the choke valve 22. Consequently, the air-fuel mixture to be supplied to the engine 10 becomes lean so that the temperature of the exhaust gas treating device and accordingly the temperature of the exhaust gases emitted therefrom are decreased to a certain suitable level.

It should be noted that although the atmospheric pressure supply control means forming part of the apparatus has been described herein above as consisting of the flow restricting means, the solenoid control valve, and the temperature responsive switch electrically connected to the solenoid control valve, the atmospheric pressure supply control means which is designated at 81' may comprise a temperature responsive valve 92 including an air vent 92a vented from the atmosphere, an atmospheric pressure supply port 92b connected to a conduit 94 connected to the atmospheric pressure supply conduit 80, and a thermostatic valve element 92c mounted on the housing of the exhaust gas treating device 42. The thermostatic valve element 92c serves to close the air vent 92a when the temperature of the exhaust gas treating device 42 is at relatively high level thereby to prevent the atmospheric pressure from being admitted to the conduit 80 and to open the air vent 92a when the temperature of the exhaust gas treating device 42 is at a relatively low level for thereby permitting the atmospheric pressure to pass into the conduit 80.

Another preferred example of the apparatus for carrying out the method of the present invention is schematically illustrated in FIG. 2 wherein like or corresponding component parts are designated by the same reference numerals as those used in FIG. 1. In this illustrated embodiment, it is intended to control the air-fuel ratio of the air-fuel mixture to be supplied to the engine through the utilization of an auxiliary power valve assembly provided in the usual carburetor instead of the choke valve provided in the carburetor. The carburetor, generally designated at 100, is herein shown as having a throttle valve 102, a main venturi 104, a small venturi 106, a main mixture circuit 108, an idling and slow-running mixture circuit 100, and a float chamber 112. The main mixture circuit 108, through which an air-fuel mixture is supplied to the carburetor induction passage for relatively heavy load operation such as cruising or high speed operation of the engine, opens into the small venturi 106. The idling and slow-running mixture circuit 110 for idle or light load operation opens to the induction passage of the carburetor downstream of the venturi 104 through a slow-running port 114 and an idling port 116. The slow-running port 114 is located at a position closely adjacent to the periphery of the throttle valve 102 when the throttle valve is substantially closed, while the idling port 116 is located posterior to or downstream of the throttle valve 102. Indicated at 118 is an idling adjusting screw for adjusting the flow rate of the mixture through the idling port 116.

There is provided in the main mixture circuit 108 a main jet 120, a main fuel and air mixer 122 and a main nozzle 124 in this sequence from the float chamber 112. The main fuel and air mixer 122 has formed at its bottom an orifice 122a and at its top an air bleed 122b vented from the atmosphere. The orifice 122a and the air bleed 122b are so calibrated as to provide a desired amount of lean air-fuel mixture, so that a lean air-fuel mixture is delivered through the nozzle 124 to the carburetor induction passage. In operation, with the throttle valve 102 substantially fully opened for a relatively heavy load operation, a sufficient vacuum is established in the small venturi 106 due to the fact that a considerable amount of air is passing through the small venturi 106 for this particular operation. Thus, a desired amount of fuel which is metered by the main jet 120 is atomized by the main fuel and air mixer 122 to provide an air-fuel mixture, which is drawn through the main nozzle 124 into the small venturi 106 by the vacuum established therein. In addition to the slow-running port 114 and the idling port 116 there is provided in the slow-running mixture circuit 110 a slow-running fuel and air mixer 126 which has formed at its bottom an orifice 126a and a first air bleed 126b vented from the ambient atmosphere. Downstream of the first air bleed 126b is provided a second air bleed 126 c which is also vented from the atmosphere. The first and second ari bleeds 126b and 126c, respectively, are so calibrated as to admit air from the ambient atmosphere at desired flow rates. While the engine is being driven under idling light load conditions with the throttle valve 102 substantially fully closed, the air flow rate delivered into the engine is not large and, therefore, little or no vacuum is established in the small venturi 106. Thus, a metered air-fuel mixture is supplied to the engine through the slow-running port 114 and idling port 116.

During the operation of the engine at high speeds and under high power output, fuel is also supplied to the main mixture circuit 108 through an auxiliary fuel passage 128 by the action of the auxiliary power valve assembly 130. The auxiliary fuel passage 128 leads from the float chamber 112 through a power valve 132 and opens into the main mixture circuit 108. This power valve 132 has an auxiliary fuel jet 134 provided between the float chamber 112 and the auxiliary fuel passage 128. The auxiliary fuel jet 134 is controlled by a tapered valve 136 which is normally held in position to close the auxiliary fuel jet 134 by means of a compression spring 136. When this valve is opened, it permits additional fuel to flow into the main mixture circuit 108 posterior to the main fuel jet 120 for enriching the air-fuel mixture to be delivered to the engine. The valve 136 is thus opened to permits this additional quantity of fuel when the engine is operating under heavy load and with open throttle to provide the additional power which is required for such engine operation.

The operation of the valve 136 is controlled by a rod 140 which, at its upper end, is connected to a vacuum piston 142 slidably accommodated within a vacuum chamber 144 formed in a casing 146. Associated with the vacuum piston 142 is a compression spring 148 which is seated on two spring seats 150 and 152 for biasing the vacuum piston 142 in its lower position to open the valve 136 when the engine is inoperative or the intake manifold vacuum is low. However, there is provided a vacuum supply passage 154 which interconnects the vacuum chamber 144 to the carburetor induction passage at a point downstream of the throttle valve 102 so that the intake manifold vacuum is delivered to the vacuum chamber 144 above the vacuum piston 142.

When the engine is operating at relatively low speeds and with the throttle valve 102 partially opened, the intake manifold vacuum in the vacuum chamber 144 is effective to hold the piston 142 and the rod 140 in its upper position so that the valve 136 is permitted to close by the action of the compression spring 138 and no additional fuel is admitted through the auxiliary fuel passage 128 to the main mixture circuit 108. When the throttle valve 102 is opened wide for the purpose of obtaining high speed or to ascend a grade, the intake manifold vacuum downstream of the throttle valve 102 drops off and becomes insufficient to overcome the effect of the compression spring 148 so that such spring will move the vacuum piston 142 and the rod 140 downwardly to open the valve 136 and allow additional fuel to enter through the auxiliary fuel passage 128 to the main mixture circuit 108.

The power valve assembly 130 thus arranged is utilized for varying the air-fuel ratio of the air-fuel mixture to be supplied to the engine as a function of the variations in the temperature of the exhaust gas treating device or the temperature of the exhaust gases therein for thereby controlling the performance efficiency or the oxidizing reaction of the exhaust gas treating device as already stated hereinabove. To this end, there is provided an apparatus for controlling the operation of the power valve assembly in dependence on the variations in the temperature of the exhaust gas treating device or the temperature of the exhaust gases therein. The apparatus, generally designated at 46', includes a first auxiliary air supply conduit 156 having one end communicating with the vacuum chamber 144 of the power valve assembly 130 and the other end connected to a main air supply conduit 158 vented to the ambient atmosphere or connected to an air cleaner (not shown) of the carburetor 100. The first auxiliary air supply conduit 156, which has a flow restricting means 156a therein, permits the air to flow into the vacuum chamber 144 when the exhaust gas treating device, indicated 42, is operating at a low temperature so that the vacuum piston 142 is moved downwardly by the action of the compression spring 148 to open the valve 136 for thereby admitting additional fuel to the main mixture circuit 108 to provide an enriched air-fuel mixture. The apparatus 46' also includes a second auxiliary air supply conduit 160 having one end connected to the main air supply conduit 158 and the other end connected to the slow-running port 114 through a third slow-running air bleed 162. This conduit 160 serves to admit additional air to the slow-running port 114 through the third air bleed 162 the exhaust gas treating device 42 reaches an excessively high temperature so that a lean air-fuel mixture is supplied to the engine. There is further provided in the apparatus 46' a three-way solenoid control valve 164 located in a position to control the communications between the conduits 158 and 156 and between the conduits 158 and 160. This solenoid control valve 164 may be any known construction insofar as it functions to provide communication between the conduits 158 and 156 when energized and to provide communication between the conduits 158 and 160 when de-energized. As shown, the solenoid control valve 164 has a solenoid coil 164 which is electrically connected through the temperature responsive 86 and the ignition switch 88 to the d.c. voltage source 90. The temperature responsive switch 86 is adapted to energize the solenoid coil 164a when the temperature of the exhaust gas treating device is at low level and de-energize the solenoid coil 164a when the exhaust gas treating device reaches an excessively high temperature.

When, in operation, the exhaust gas treating device 42 is operating at a relatively low level, the temperature responsive switch 86 is closed to energize the solenoid coil 164a of the solenoid control valve 164 so that the conduit 156 is caused to communicate with the conduit 158 while the communication between the conduits 158 and 160 is interrupted. In this instance, the air is admitted through the conduit 156 to the vacuum chamber 144 above the vacuum piston 142. Under this circumstance, the intake manifold vacuum admitted into the vacuum chamber 144 drops so that it is insufficient to overcome the effect of the compression spring 148. Consequently, the compression spring 148 moves the vacuum piston 144 and the rod 140 downwardly of the drawing thereby opening the valve 136 and, therefore, the additional fuel is admitted through the auxiliary fuel passage 128 to the main mixture passage 108. Thus, the air-fuel mixture to be supplied to the engine is enriched with a result that the quantities of unburned compounds in the exhaust gases are increased and the exhaust gases containing therein a large quantity of the unburned compounds are passed through the exhaust pipe 44 into the exhaust gas treating device 42. This is reflected by an increased oxidizing reaction of the exhaust gas treating device 42 so that the temperature of the device 42 increases.

As the temperature of the exhaust gas treating device 42 reaches an excessively high level, the temperature responsive switch 86 is opened to deenergize the solenoid coil 164a of the solenoid control valve 164. In this instance, the communication between the conduits 158 and 156 is interrupted so that no air is admitted to the vacuum chamber 144. Under this circumstance, the intake manifold vacuum in the vacuum chamber 144 is sufficient to overcome the force of the compression spring 148 and, accordingly, the vacuum piston 142 and the rod 140 is moved upwardly thereby closing the power valve 132 for preventing the additional fuel from being admitted to the main mixture circuit 108. At the same time, the conduit 160 is caused to communicate with 164 by the action of the solenoid control valve 164 so 164 so that the air is admitted through the conduit 160 and the third slow-running air bleed 162 to the slow-running port 114, from which the air is drawn into the carburetor induction passage to provide a lean air-fuel mixture. The lean air-fuel mixture will produce a less quantity of the unburned compounds in the exhaust gases emitted from the engine and, therefore, the oxidizing reaction of the exhaust gas treating device 42 is decreased so that the temperature thereof will decreases.

It will thus be understood that the exhaust gas treating device can be maintained at its optimum performance efficiency at all time by controlling the air-fuel ratio of the air-fuel mixture to be supplied to the engine in accordance with the temperature of the exhaust gas treating device or the temperature of the engine exhaust gases therein whereby the concentrations of noxious and harmful compounds in the engine exhaust gases can be satisfactorily eliminated.

What is claimed is:

1. In a gasoline powered internal combustion engine having an exhaust manifold with an exhaust pipe leading therefrom and having a carburetor provided with a main mixture circuit adapted to supply an air-fuel mixture to the carburetor induction passage for high speed and acceleration operations of the engine, an idling and slow-running mixture circuit adapted to supply an air-fuel mixture to the carburetor induction passage for slow-running and deceleration operations of the engine, a throttle valve disposed in the carburetor induction passage for controlling the quantity and air-fuel ratio of the air-fuel mixture to be supplied to the engine, and a fuel supply reservoir which supplies fuel to the two circuits, the combination comprising a power valve assembly including a power valve located between said fuel supply reservoir and an auxiliary fuel passage communicating with said main mixture circuit to supply additional fuel when opened thereinto for thereby providing an enriched air-fuel mixture, said power valve assembly further including a vacuum chamber communicating with said carburetor induction passage downstream of said throttle valve and a vacuum piston slidably accommodated in said vacuum chamber, said vacuum piston being interconnected with said power valve and opening the same when the intake manifold vacuum delivered to said vacuum chamber is low, an air bleed communicating with a slow-running port of said idling and slow-running mixture circuit, an exhaust gas treating device mounted on the exhaust pipe, a main air supply conduit vented to the atmosphere, a first auxiliary air supply conduit having one end connected to said main air supply conduit and the other end connected to the vacuum chamber of said power valve assembly, a second auxiliary air supply conduit having one end connected to said main air supply conduit and the other end communicating with said air bleed, a three-way solenoid control valve disposed in said main air supply conduit to control communication between said main and first conduits and communication between said main and second conduits, and a temperature responsive switch means electrically connected to said solenoid control valve, said temperature responsive switch means being mounted on said exhaust pipe downstream of said exhaust gas treating device and responsive to the temperature of at least one of said exhaust gas treating device and exhaust gases therein, said temperature responsive switch means energizing said solenoid control valve, when the temperature of at least one of said exhaust gas treating device and the exhaust gases therein is at low level, for thereby causing said solenoid control valve to provide communication between said main air supply conduit and said first auxiliary air supply conduit to permit air to flow into said vacuum chamber of said power valve assembly to cause the same to permit additional fuel to pass into said main mixture circuit to enrich the air-fuel mixture to be supplied to said engine, whereby said engine is caused to discharge exhaust gases containing a larger amount of unburned compounds thereby to promote oxidizing reaction of the exhaust gases in said exhaust gas treating device, and said temperature responsive switch means de-energizing said solenoid control valve, when the temperature of at least one of said exhaust gas treating device and the exhaust gases therein is at an excessively high level, for thereby causing said solenoid control valve to prevent communication between said main supply conduit and said first auxiliary air supply conduit to prevent supply of additional fuel into said main mixture circuit while providing communication between said main air supply conduit and said second auxiliary air supply conduit to admit additional air to said carburetor induction passage through said air bleed thereby to lean the air-fuel mixture supplied to said engine, whereby said engine is caused to discharge exhaust gases containing a smaller amount of unburned compounds thereby to lower oxidizing reaction of the exhaust gases in said exhaust gas treating device.

* * * * *